(12) United States Patent
Maeda et al.

(10) Patent No.: US 9,990,141 B1
(45) Date of Patent: Jun. 5, 2018

(54) STORAGE CONTROL DEVICE, STORAGE SYSTEM AND METHOD

(71) Applicant: FUJITSU LIMITED, Kawasaki-shi, Kanagawa (JP)

(72) Inventors: Chikashi Maeda, Kawasaki (JP); Yukari Tsuchiyama, Kawasaki (JP); Takeshi Watanabe, Kawasaki (JP); Guangyu Zhou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/792,874

(22) Filed: Oct. 25, 2017

(30) Foreign Application Priority Data

Dec. 1, 2016 (JP) .................................. 2016-234304

(51) Int. Cl.
- *G11B 5/09* (2006.01)
- *G06F 13/00* (2006.01)
- *G06F 3/06* (2006.01)

(52) U.S. Cl.
CPC ............ *G06F 3/061* (2013.01); *G06F 3/0665* (2013.01); *G06F 3/0689* (2013.01); *G06F 2003/0691* (2013.01); *G06F 2003/0695* (2013.01)

(58) Field of Classification Search
CPC .. G11B 5/00; G11B 5/02; G11B 20/10; G11B 27/36; G11B 5/012; G11B 2220/20; G11B 27/3027; G11B 5/59627; G11B 5/5534; G06F 3/0601; G06F 3/0676; G06F 3/0689; G06F 21/79; G06F 12/1441; G06F 13/1689; G06F 13/424

USPC .......... 360/24, 31, 48, 55; 711/112, 167, 163
See application file for complete search history.

(56) References Cited

U.S. PATENT DOCUMENTS

| 5,802,028 A | 9/1998 | Igarashi |
| 7,904,644 B1 * | 3/2011 | Pinvidic ................ G06F 13/385 710/52 |
| 2010/0058021 A1 | 3/2010 | Kawamura |
| 2015/0220271 A1 | 8/2015 | Yoshida et al. |

FOREIGN PATENT DOCUMENTS

| JP | 8-147110 | 6/1996 |
| JP | 2010-55557 | 3/2010 |
| JP | 2015-143945 | 8/2015 |

* cited by examiner

*Primary Examiner* — Nabil Hindi
(74) *Attorney, Agent, or Firm* — Staas & Halsey LLP

(57) ABSTRACT

A storage control device configured to control a storage device includes a memory and a processor coupled to the memory and configured to receive a request of writing of data from an information processing device, assign a unit memory area in the storage device in response to the request of writing, determine whether a sequential format processing is to be executed on the unit memory area based on continuity of logical addresses designated by the request of writing, and determine a timing to execute the sequential format processing on the unit memory area based on a number of commands per unit time to the storage device when the sequential format processing is determined to be executed on the unit memory area.

20 Claims, 15 Drawing Sheets

FIG. 4

| LOGICAL VOLUME NUMBER | LOGICAL ADDRESS | UPDATE TIME |
|---|---|---|
| 0 | 0x66883400 | 11:23:54:423 |
| 0 | 0x11442230 | 11:25:24:216 |
| : | : | : |
| 1 | 0xFFFFFFFF | INVALID VALUE |
| 1 | 0xFFFFFFFF | INVALID VALUE |
| : | : | : |
| N | 0xFFFFFFFF | INVALID VALUE |

SEQUENTIAL MANAGEMENT TABLE — 400

| | CHUNK NUMBER | FORMAT STATUS | SEQUENTIAL FORMATTING APPROPRIATENESS | LOGICAL VOLUME NUMBER | LOGICAL ADDRESS |
|---|---|---|---|---|---|
| 500-1 | 0 | 0 | 0 | 0x0004 | 0x00004700 |
| 500-2 | 1 | 1 | 0 | 0x0007 | 0x00123200 |
| 500-3 | 2 | 1 | 1 | 0x0003 | 0x0005C400 |
| 500-4 | 3 | 1 | 0 | 0xFFFF | 0xFFFFFFFF |
| ...... | : | : | : | : | : |
| 500-n | n | 1 | 0 | 0xFFFF | 0xFFFFFFFF |

CHUNK INFORMATION TABLE ~500

FIG. 7

| | LOGICAL VOLUME NUMVER | LOGICAL ADDRESS | UPDATE TIME |
|---|---|---|---|
| 400-1 | 0 | 0x66883400 | 11:23:54:423 |
| 400-2 | 0 | 0x11442230 | 11:25:24:216 |
| 400-3 | 0 | 0x24330000 | 10:24:36:006 |
| 400-4 | 0 | 0xFFFFFFFF | INVALID VALUE |

FIG. 8
(8-1)
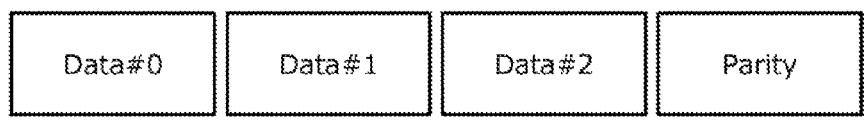
(8-2)
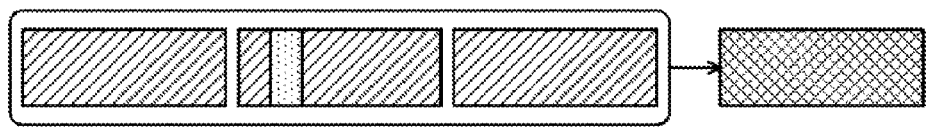
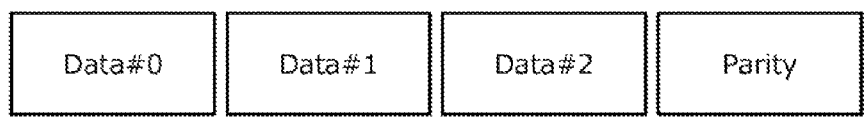
(8-3)
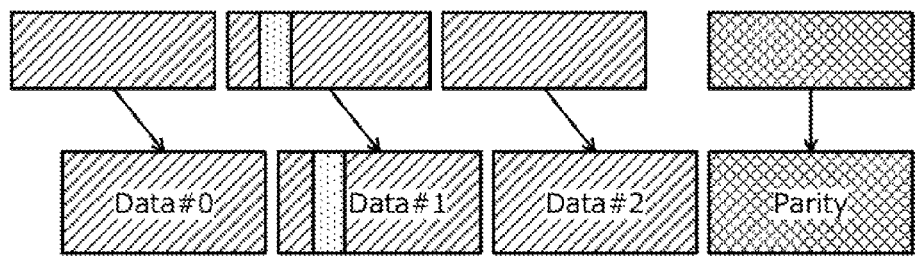
 USER DATA  ZERO DATA  PARITY DATA

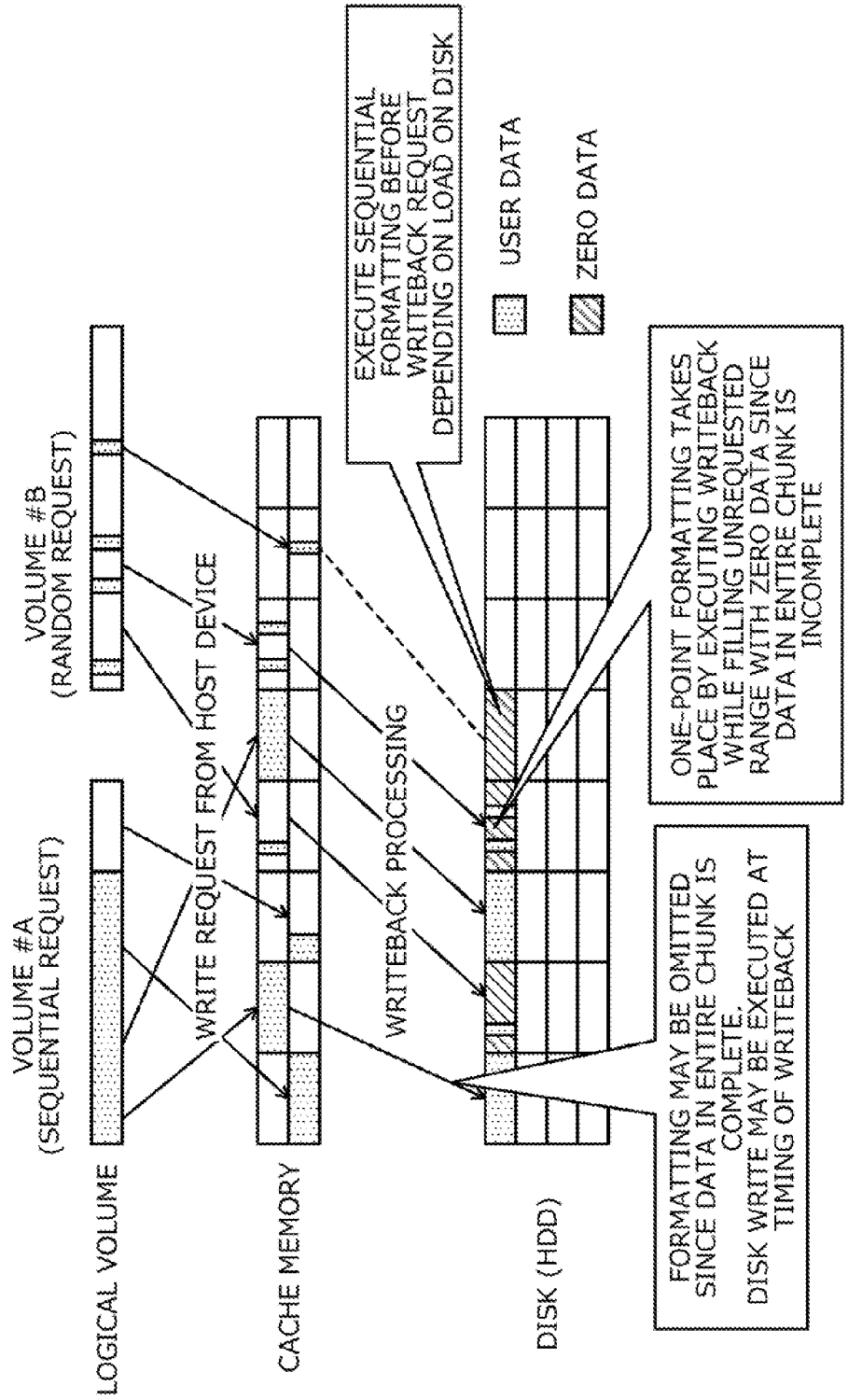

US 9,990,141 B1

STORAGE CONTROL DEVICE, STORAGE SYSTEM AND METHOD

CROSS-REFERENCE TO RELATED APPLICATION

This application is based upon and claims the benefit of priority of the prior Japanese Patent Application No. 2016-234304, filed on Dec. 1, 2016, the entire contents of which are incorporated herein by reference.

FIELD

The embodiment discussed herein is related to a storage control device, a storage system and a method.

BACKGROUND

There has been a storage for a virtualized environment, or so-called a virtualized storage device serving as a storage system capable of realizing a memory device with a volume configuration and a memory capacity which are freely designed without being bound by physical factors of a memory device such as a volume configuration and a memory capacity. When the virtualized storage device offers a volume to a server, processing to format the volume is executed. In the format processing, zero data is written in a corresponding physical memory area in the storage, for example.

Related background art includes a technique which is configured to control execution of zero-initialization processing on a memory area in a storage unit to undergo zero-initialization, the storage unit being specified by assignment information containing as assignment status of the memory area in the storage unit, depending on performance information on the storage unit. Meanwhile, there is a technique configured such that, when there is an instruction for formatting and the like that involves an externally coupled volume, a controller in a main storage converts commands for that instruction into formatting instructions or area release instructions targeted at an allocation-on-use (AOU) volume in an external storage. Moreover, there is also a technique configured such that, when data is recorded in a virgin cluster on a data track, null data is written in a write buffer for one cluster, then write data is written in a location corresponding to an allocation block to record the write data, and the data for the one cluster written in the write buffer is recorded in a cluster on the data track. These techniques of the background art are disclosed in Japanese Laid-open Patent Publication Nos. 2015-143945, 2010-55557, and 8-147110.

SUMMARY

According to an aspect of the invention, a storage control device configured to control a storage device includes a memory and a processor coupled to the memory and configured to receive a request of writing of data from an information processing device, assign a unit memory area in the storage device in response to the request of writing, determine whether a sequential format processing is to be executed on the unit memory area based on continuity of logical addresses designated by the request of writing, and determine a timing to execute the sequential format processing on the unit memory area based on a number of commands per unit time to the storage device when the sequential format processing is determined to be executed on the unit memory area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram illustrating an example of memory contents in a sequential management table;

FIG. 5 is an explanatory diagram illustrating an example of memory contents in a chunk information table;

FIG. 7 is an explanatory diagram illustrating an example of determination of access destination address continuity;

FIG. 8 is an explanatory diagram illustrating a specific example of writeback processing including one-point formatting;

FIG. 15 is an explanatory diagram illustrating a format operation example corresponding to I/O request patterns.

DESCRIPTION OF EMBODIMENT

The conventional techniques have a risk of an increase in access load to the storage due to the format processing on the volume, which may lead to deterioration in input or output (I/O) performance.

A storage control device and a storage control program according to an embodiment are described below in detail with reference to the accompanying drawings.

Figure 1:
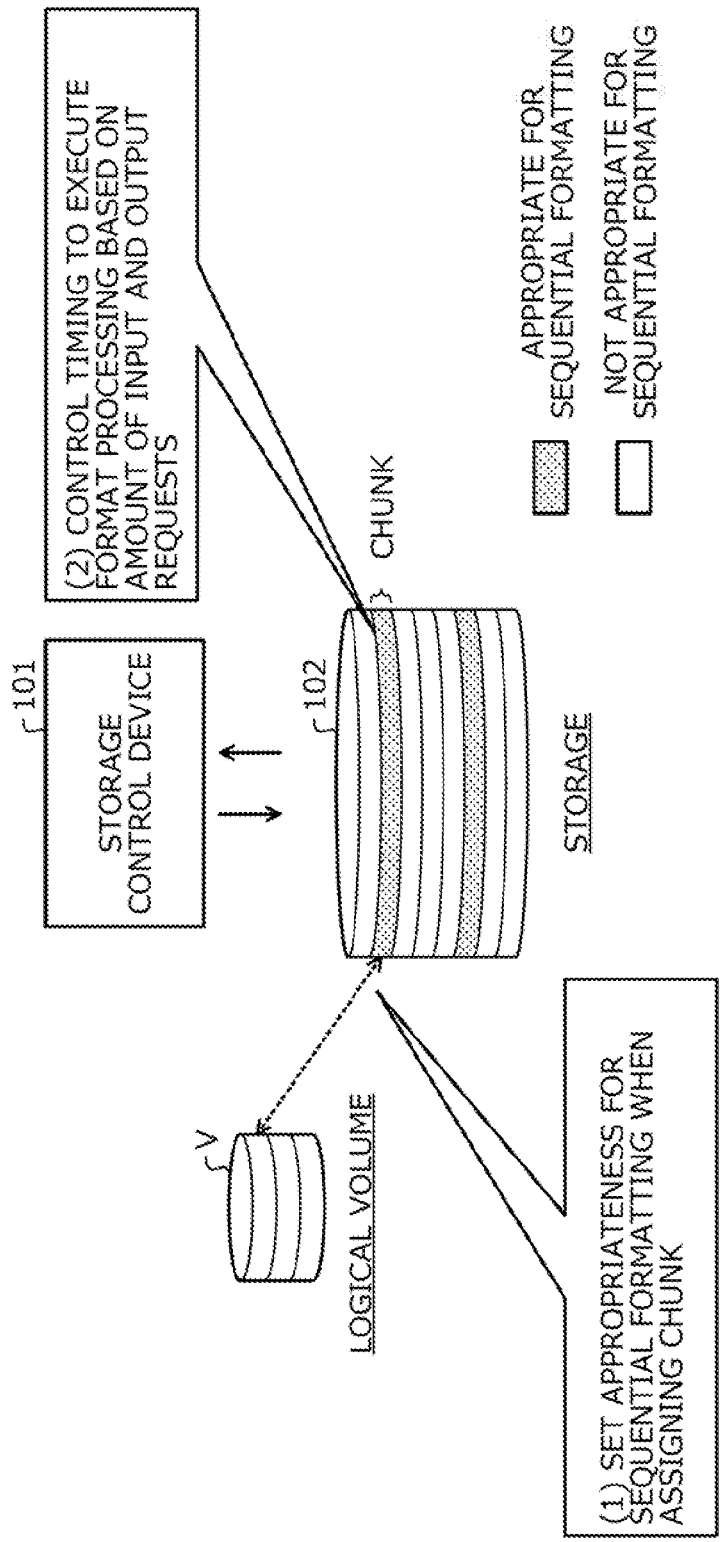
FIG. 1 is an explanatory diagram illustrating an example of a storage control device according to an embodiment.

FIG. 1 is an explanatory diagram illustrating an example of a storage control device 101 according to an embodiment. In FIG. 1, the storage control device 101 is a computer which controls access to a storage 102. The storage 102 includes one or more memory devices. For example, such a memory device is any of a hard disk, an optical disk, a flash memory, a magnetic tape, and the like.

The storage control device 101 is a RAID controller applied to a virtualized storage device having a configuration for redundant arrays of inexpensive disks (RAID), for example. The virtualized storage device is a storage device applying thin provisioning.

The thin provisioning is a technique for reducing a physical capacity of a storage by virtualizing and assigning storage resources. In an environment where the thin provisioning is introduced, a capacity corresponding to a request of a user is not assigned to a physical disk, but is assigned as a "logical volume (virtual volume)" instead. The physical disk is managed as a shared disk pool, and a capacity is assigned to the physical disk or the like depending on an amount of data written in the logical volume.

Here, when the virtualized storage device offers a volume to a server, processing to format the volume is executed. In the format processing, zero data or a check code is written on a corresponding physical memory area in the storage, for example. However, actual writing of the zero data in the physical disk takes time. Therefore, the format processing on the volume is executed in the background.

The format processing to be executed in the background includes sequential formatting and one-point formatting, for example. The sequential formatting is designed to write zero data sequentially starting from the head of the physical memory area to be formatted. The one-point formatting is designed to write zero data in a physical memory area in an unformatted state in advance when there is a request for I/O to or from this physical memory area, and then to process the requested I/O.

However, an I/O performance deteriorates if an access load on the storage is increased by the format processing on the volume to be executed in the background. In the meantime, when the one-point formatting is operated, an I/O response may be deteriorated because the requested I/O is executed after writing the zero data.

Accordingly, in this embodiment, the storage control device 101 performs the format processing efficiently by controlling a timing to execute the format processing on the physical memory area in the storage 102 based on an amount of input and output requests to the storage 102. Now, an example of processing of the storage control device 101 is described below.

(1) At the time of assignment to the physical memory area in the storage 102 associated with a write request, the storage control device 101 sets appropriateness for the sequential formatting for each unit of assignment of the physical memory area based on access destination address continuity. Here, the assignment of the physical memory area requests assignment of the physical memory area in the storage 102 to a volume (such as a logical volume V). The unit of assignment of the physical memory area is determined in advance.

In the following description, the unit of assignment of the physical memory area may be expressed as a "chunk" as appropriate.

Here, if the write request is a request to sequential addresses, then it is likely that write data are organized for all areas in the chunk. Accordingly, in the case of the request to the sequential addresses, it is likely that there is no overhead at the time of writing during the format processing. Hence, it seems that the writing only has to be executed at the time of writeback.

On the other hand, if the write request is a request to random addresses, then it is unlikely that write data are organized for all areas in the chunk. Accordingly, in the case of the request to the random addresses, overhead is incurred by the format processing. Hence, the storage control device 101 sets the appropriateness for the sequential formatting on the chunk assigned by the write request to the random addresses.

(2) The storage control device 101 controls the timing to execute the format processing on the chunk, to which the appropriateness for the sequential formatting is set, based on the amount of input and output requests to the storage 102. Here, the amount of input and output requests to the storage 102 is an index indicating a load on the storage 102, which is expressed by the number of commands (such as write commands and read commands) being issued to the storage 102, for example.

To be more precise, when the amount of input and output requests to the storage 102 falls below a prescribed value, the storage control device 101 executes the format processing on a chunk in an unformatted state to which the appropriateness for the sequential formatting is set. The prescribed value may be set to any value. For example, the prescribed value is set to a value such that the load on the storage 102 is deemed to be not so high as long as the amount of input and output requests falls below the prescribed value. Thus, it is possible to reduce the risk of deterioration in I/O performance that might be caused by executing the sequential formatting in the state of a high load on the storage 102.

In the meantime, when an increase in amount of input and output requests per unit time exceeds a threshold, the storage control device 101 may be configured not to execute the format processing on the chunk even if the amount of input and output requests falls below the prescribed value. The threshold may be set to any value. For example, the threshold is set to a value such that a sharp increase in load on the storage 102 is anticipated if the increase in amount of input and output requests exceeds the threshold. Thus, it is possible to suppress execution of the sequential formatting at a timing when a sharp increase in I/O quantity is anticipated in the future.

As described above, according to the storage control device 101, it is possible to control the timing to execute the format processing on the chunk appropriate for the sequential formatting, based on the amount of input and output requests to the storage 102. The chunk appropriate for the sequential formatting is a chunk assigned by the write request to the random addresses.

Thus, it is possible to execute the format processing on the chunk, which may incur the overhead, in the state where the load on the storage 102 is sufficiently low so as not to cause deterioration in I/O performance even if the background processing is executed, for example. Moreover, it is possible to reduce an operation frequency of the one-point formatting by proceeding with the format processing on the chunk in the state of the low load on the storage 102.

(System Configuration Example of Storage System 200)

Next, a description is given of a case of applying the storage control device 101 illustrated in FIG. 1 to a storage system 200. The storage system 200 is a RAID 5 redundant system, for example.

Figure 2:
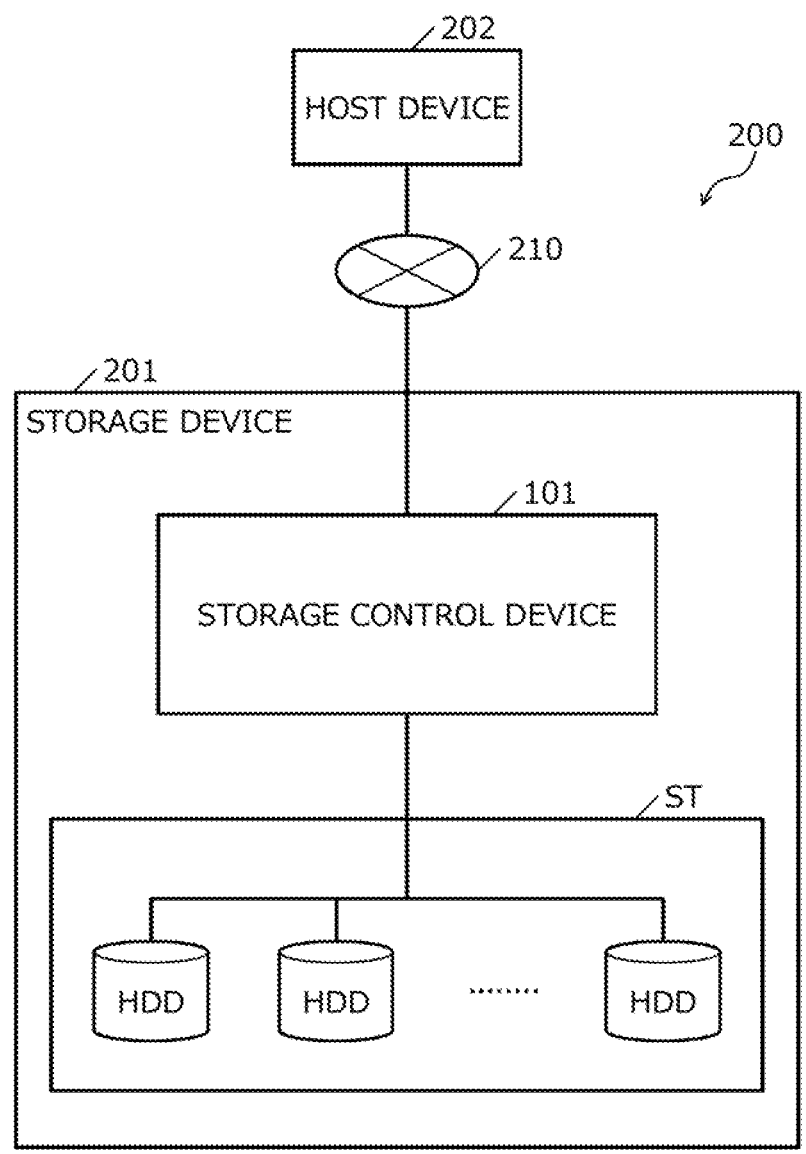
FIG. 2 is an explanatory diagram illustrating a system configuration example of a storage system.

FIG. 2 is an explanatory diagram illustrating a system configuration example of the storage system 200. In FIG. 2, the storage system 200 includes a storage device 201 and a host device 202. In the storage system 200, the storage device 201 and the host device 202 are coupled to each other through a wired or wireless network 210. Examples of the network 210 include a local area network (LAN), a wide area network (WAN), the Internet, and the like.

Here, the storage device 201 includes the storage control device 101 and a storage ST. The storage ST includes hard disk drives (HDDs). However, solid-state drives (SSDs) may be used instead of the HDDs. In the storage ST, each RAID group is formed of one or more HDDs while a pool (a physical capacity pool) is formed of one or more RAID groups. The storage 102 illustrated in FIG. 1 corresponds to the storage ST, for example.

The storage control device 101 includes a configuration table and an assignment table which are not illustrated. The configuration table stores logical volumes formed in the device, and various management information on the disks constituting the RAID, for example. The assignment table stores information on each of assignment units (chunks) in a thin provisioning configuration, and correspondence information on a logical address and a physical address to each assigned chunk. The assignment table includes a chunk information table 500, for example, which is illustrated in FIG. 5 to be described later.

The host device 202 is a computer which requests for data reading or writing involving the logical volume (the virtual volume) offered by the storage system 200. For example, the host device 202 is a business server which uses the storage system 200, a management server which manages the storage system 200, and the like.

Although only one storage control device 101 and only host device 202 are illustrated in the example of FIG. 2, the storage system 200 may include multiple storage control devices 101 and host devices 202.

Figure 3:
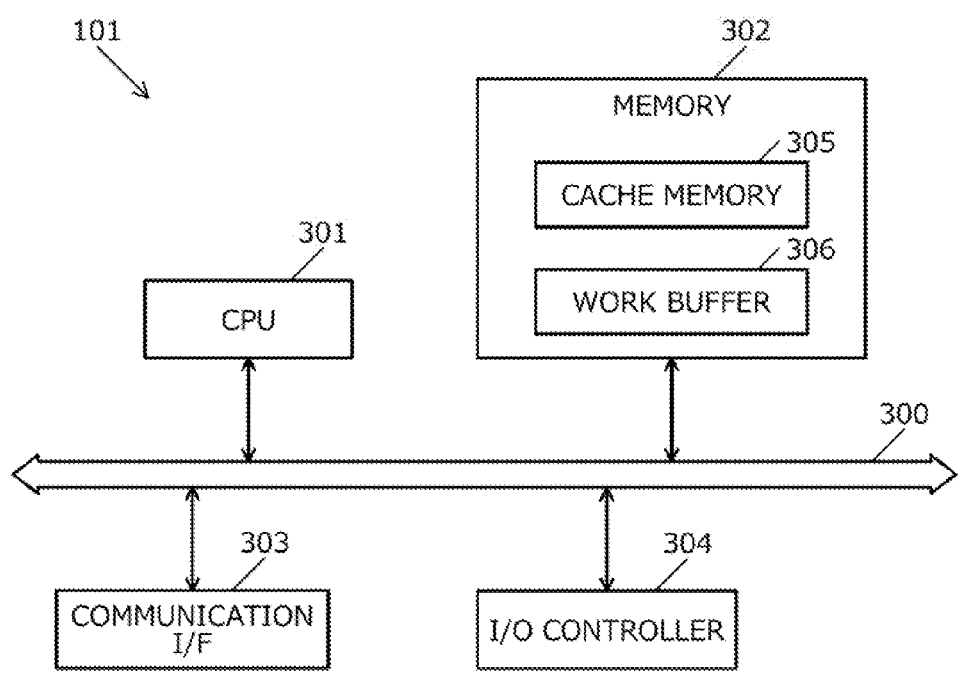
FIG. 3 is a block diagram illustrating a hardware configuration example of a storage control device.

(Hardware Configuration Example of Storage Control Device 101) FIG. 3 is a block diagram illustrating a hardware configuration example of the storage control device 101. In FIG. 3, the storage control device 101 includes a central processing unit (CPU) 301, a memory 302, a communication interface (I/F) 303, and an I/O controller 304. These constituents are coupled to one another by using a bus 300.

Here, the CPU 301 takes charge of the overall control of the storage control device 101. For example, the memory 302 includes a read only memory (ROM), a random access memory (RAM), a flash ROM, and the like. Specifically, the flash ROM and the ROM store various programs while the RAM is used as a work area for the CPU 301, for example. The programs stored in the memory 302 are loaded into the CPU 301, thereby causing the CPU 301 to execute processing which is coded therein.

The RAM includes a cache memory 305 and a work buffer 306. For example, I/O data requested from the host device 202 are temporarily stored in the cache memory 305. The work buffer 306 is used for processing data other than the I/O data requested from the host device 202.

The communication I/F 303 is coupled to the network 210 through a communication line, and is then coupled to an external device (such as the host device 202 illustrated in FIG. 2) through the network 210. In the meantime, the communication I/F 303 takes charge of an interface between the network 210 and the inside of the device, and controls input and output of data to and from the external device. The communication I/F 303 includes a channel adapter (CA), for example. The I/O controller 304 accesses the storage ST (see FIG. 2) under the control of the CPU 301.

(Memory Contents in Sequential Management Table 400)

Next, memory contents in a sequential management table 400 included in the storage control device 101 are described. The sequential management table 400 is stored in the memory 302 illustrated in FIG. 3, for example.

FIG. 4 is an explanatory diagram illustrating an example of the memory contents in the sequential management table 400. In FIG. 4, the sequential management table 400 includes fields for logical volume number, logical address, and update time. Pieces of sequential management information (such as sequential management information pieces 400-1 and 400-2) are stored as records by setting information in the respective fields.

Here, each logical volume number field is an identifier to identify a logical volume offered by the storage system 200. Each logical address field is obtained by adding "1" to a terminal logical address at the time of access to the logical volume of the corresponding logical number. Accordingly, if subsequent access is access to this logical address, then it is possible to determine that the access destination addresses have continuity. Each update time field represents time of access to the logical volume of the corresponding logical volume number. The update time may also include date.

Note that in the sequential management table 400, multiple entries (such as four entries) are prepared for each logical volume.

(Memory Contents in Chunk Information Table 500)

Next, memory contents in the chunk information table 500 included in the storage control device 101 are described. The chunk information table 500 is stored in the memory 302, for example.

FIG. 5 is an explanatory diagram illustrating an example of the memory contents in the chunk information table 500. In FIG. 5, the chunk information table 500 includes fields for chunk number, format status, sequential formatting appropriateness, logical volume number, and logical address. Chunk information pieces 500-1 to 500-$n$ (n is an integer equal to or above 2) are stored as records by setting information in the respective fields.

Here, each chunk number field is an identifier to identify a chunk in the storage ST. The chunk is a unit of assignment of the physical memory area assigned to the corresponding logical volume. Each format status field indicates whether or not the chunk of the corresponding chunk number is formatted. Here, the chunk is formatted when the corresponding format status field has a value "0". On the other hand, the chunk is in an unformatted state when the corresponding format status field has a value "1".

Each sequential formatting appropriateness field indicates whether or not it is appropriate to subject the chunk of the corresponding chunk number to the sequential formatting. Here, the chunk is appropriate for the sequential formatting when the corresponding sequential formatting appropriateness field has a value "1". On the other hand, the chunk not appropriate for the sequential formatting when the corresponding sequential formatting appropriateness field has a value "0".

Each logical volume number field is an identifier to identify a logical volume (a user volume) to which the chunk of the corresponding chunk number is assigned. Here, a logical volume number "0xFFFF" indicates an unassigned state. Each logical address field indicates the address of the logical volume to which the chunk of the corresponding chunk number is assigned.

(Functional Configuration Example of Storage Control Device 101)

Figure 6:
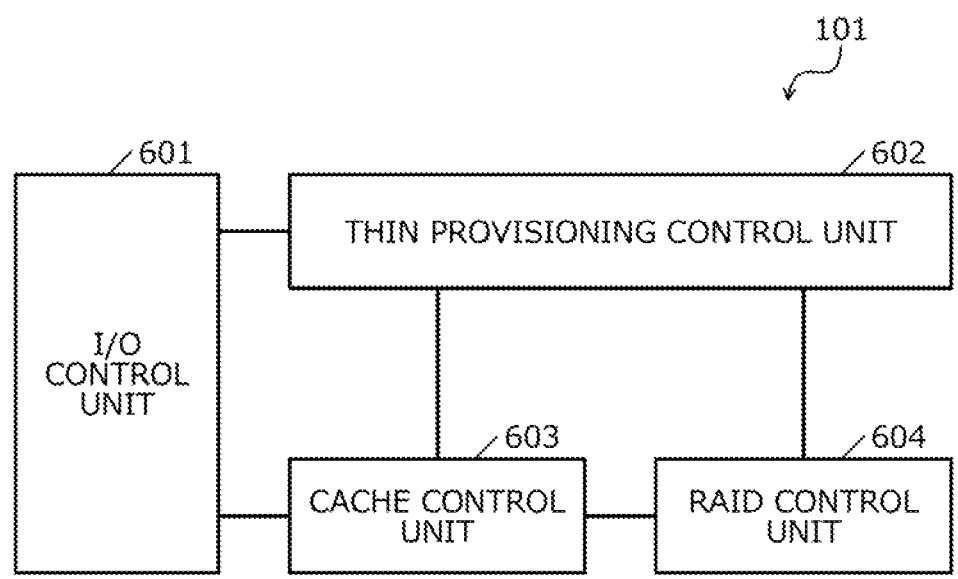
FIG. 6 is a block diagram illustrating a functional configuration example of the storage control device.

FIG. 6 is a block diagram illustrating a functional configuration example of the storage control device 101. In FIG. 6, the storage control device 101 is configured to include an I/O control unit 601, a thin provisioning control unit 602 (hereinafter simply referred to as a "thinpro control unit 602"), a cache control unit 603, and a RAID control unit 604. The I/O control unit 601, the thinpro control unit 602, the cache control unit 603, and the RAID control unit 604 represent functions serving as the control units. Specifically, the functions are implemented by causing the CPU 301 to execute programs stored in the memory 302 illustrated in FIG. 3 or by using the communication I/F 303 and the I/O controller 304. Processing results by the respective function units are stored in the memory 302 or the storage ST, for example.

The I/O control unit 601 processes an I/O request from the host device 202 and a response thereto. The I/O request is either a write request or a read request. The write request represents a request to the logical volume for data writing. The read request represents a request to the logical volume for data reading.

The write request includes information to specify write data (data to be written) and a write request range (a range of request to be written). For example, the information to specify the write request range includes the logical volume number, a start logical address of the write request range, the number of blocks of the write data, and the like.

Specifically, the I/O control unit 601 receives the I/O request from the host device 202 and notifies the thinpro control unit 602 thereof, for example. Meanwhile, the I/O control unit 601 notifies the host device 202 of a write completion response to the write request and of read data in response to the read request, for example.

The thinpro control unit 602 manages a logical address and a physical address of the logical volume to be offered to the host device 202. The logical address is an address in the logical volume. The physical address is an address (a logical block addressing, or LBA) in the corresponding HDD in the storage ST.

Upon receipt of the write request, the thinpro control unit 602 determines the access destination address continuity. Here, the continuity is determined to be present if the write request is the request to the sequential addresses. The continuity is determined to be absent if the write request is the request to the random addresses.

Specifically, the thinpro control unit 602 determines the access destination address continuity of the received write request with reference to the sequential management table 400 illustrated in FIG. 4. Here, an example of determination of the access destination address continuity is described later by using FIG. 7.

Meanwhile, upon receipt of the write request, the thinpro control unit 602 determines whether or not the write request range is a range to which the chunk is assigned. Here, if the chunk is yet to be assigned, the thinpro control unit 602 assigns an unused chunk to the logical volume (the write request range).

When the chunk is assigned, the corresponding piece of the chunk information in the chunk information table 500 illustrated in FIG. 5 is updated, for example. The chunk information to be updated is the piece of the chunk information corresponding to the chunk number of the assigned chunk. To be more precise, the logical volume number and the start logical address of the write request range included in the write request are set to the logical volume number and to the logical address of the chunk information, for example. At this point, the format status field of the chunk information is set to an initial value (1, for example). Meanwhile, the sequential formatting appropriateness field of the chunk information is set to an initial value (0, for example).

In the meantime, the thinpro control unit 602 sets the appropriateness for the sequential formatting on the assigned chunk based on the determined access destination address continuity. Specifically, when the access destination address continuity is determined to be present, for example, the thinpro control unit 602 sets non-appropriateness for the sequential formatting to the assigned chunk.

On the other hand, when the access destination address continuity is determined to be absent, the thinpro control unit 602 sets the appropriateness for the sequential formatting to the assigned chunk. The appropriateness for the sequential formatting thus set is set to the corresponding piece of the chunk information in the chunk information table 500.

Here, if it is not possible to determine the access destination address continuity of the write request at the point when the chunk is assigned, then the thinpro control unit 602 may be configured to set the appropriateness for the sequential formatting to the assigned chunk.

Meanwhile, a value of the check code corresponding to the chunk is determined at the point of assignment of the chunk to the logical volume in association with the write request, for example. Specifically, the value of the check code is determined by the CA of the storage control device 101 and based on a logical address of the logical volume of an access destination, for example. Then, the storage control device 101 performs the write processing on the assigned chunk by using the determined value of the check code. The write processing on the chunk includes, write processing associated with the sequential formatting and write processing associated with a writeback request, for example.

Here, the received write request (including the write data) are stored in the cache memory 305 illustrated in FIG. 3 by the cache control unit 603, for example. As a consequence, the I/O control unit 601 transmits a write completion response to the host device 202.

The cache control unit 603 allocates the received I/O data (such as the write request) onto the cache memory 305. Moreover, the cache control unit 603 manages timings for the writeback to the corresponding HDD in the storage ST and for staging from the corresponding HDD in the storage ST.

The RAID control unit 604 issues a command to the corresponding HDD in the storage ST. Moreover, the RAID control unit 604 performs load management of the RAID. Specifically, when a processing request accompanied by the reading or writing involving the corresponding disk (the HDD) is received from the cache control unit 603, the RAID control unit 604 issues a command to the HDD in the pool in response to the processing request. The processing request accompanied by the reading or writing involving the disk includes the writeback request, for example.

In this case, the RAID control unit 604 adds the number of commends issued to the HDD in the pool in response to the processing request, to the number of commands issued to the pool. Meanwhile, when the processing accompanied by the reading or writing involving the disk is completed, the RAID control unit 604 subtracts the number of commands corresponding to the processing request from the number of commands issued to the pool.

Thus, it is possible to manage the number of commands being issued to the pool, that is, an amount of pool-based I/O requests in the storage ST. Although the number of issued commands is managed based on of the pool in the storage ST in this case, the way of management is not limited only to the foregoing. For example, the number of issued commands may be managed based on the HDD or based on the RAID group in the storage ST.

In the meantime, the RAID control unit 604 controls the timing to execute the format processing on the chunk to which the appropriateness for the sequential formatting is set. Specifically, the RAID control unit 604 executes the format processing on the chunk in the unformatted state, to which the appropriateness for the sequential formatting is set, when the amount of I/O requests to the storage ST falls below a prescribed value X.

The amount of I/O requests to the storage ST is the above-mentioned pool-based amount of issued commands, for example. The prescribed value X may be set to any value depending on the RAID configuration, the disk type, and the like. For example, the prescribed value X is set to a value (several to several tens of commands) such that the load on the disk is deemed to be not so high as long as the amount of I/O requests falls below the prescribed value X.

To be more precise, the RAID control unit 604 writes the zero data and the check code in the chunk in the unformatted state to which the appropriateness for the sequential formatting is set, for example. Here, the check code is information added to a block unit (such as a 512-byte unit) for checking data consistency.

The value of the check code corresponding to the chunk is determined at the point of assignment of the chunk to the logical volume in association with the write request. Specifically, the value of the check code is determined by the CA of the storage control device 101 and based on a logical address of the logical volume corresponding to the chunk, for example.

Then, the RAID control unit 604 categorizes the chunk subjected to the sequential formatting as being formatted. To be more precise, the RAID control unit 604 sets the value "0" to the format status field in the piece of chunk information in the chunk information table 500, the piece of chunk information corresponding to the chunk subjected to the sequential formatting, for example.

Meanwhile, at the time of the write processing on the chunk in the unformatted state, the RAID control unit 604 performs the writing by use of data prepared by padding portions other than the write data with a format pattern. Here, the padding is an operation to fill in the portion other than the write data with the format pattern when handling fixed-length data. The format pattern is the zero data, for example.

Specifically, upon receipt of a request from the cache control unit 603 for writeback to the chunk in the unformatted state, the RAID control unit 604 determines whether or not the request is the writeback request to the entire chunk, for example. The writeback request includes information specifying the write data or the write request range, for instance. To be more precise, when the write request range designates the entire chunk, for example, the RAID control unit 604 determines that the request is the writeback request to the entire chunk.

Here, in the case of the writeback request to the entire chunk, the RAID control unit 604 executes the write processing while skipping the format processing on the chunk. Specifically, the RAID control unit 604 executes the existing writeback processing on the chunk requested for the writeback by using the write data on the cache memory 305 and using the check code, for example.

Note that the RAID control unit 604 executes the existing writeback processing on the chunk requested for the writeback by using the write data on the cache memory 305 and using the check code also in the case of receiving the writeback request to the formatted chunk.

On the other hand, if the request is not the writeback request to the entire chunk, the RAID control unit 604 acquires the work buffer 306 illustrated in FIG. 3. Next, the RAID control unit 604 forms on the work buffer 306 the zero data that attaches the check code for an unrequested range (the portion other than the write request range) in the chunk to which the writeback is requested. Then, the RAID control unit 604 issues a write command to the pool in the storage ST by using the data on the work buffer 306 and the write data on the cache memory 305.

Thus, it is possible to execute the one-point formatting on the chunk in the unformatted state at the time of the write processing on the chunk. When the writeback processing is completed, the RAID control unit 604 sends a writeback completion response to the cache control unit 603.

Note that a specific example of the writeback processing including the one-point formatting on the chunk in the unformatted state is described later by using FIG. 8.

(Example of Determination of Access Destination Address Continuity)

Now, an example of determination of the access destination address continuity is described.

FIG. 7 is an explanatory diagram illustrating the example of determination of the access destination address continuity. In FIG. 7, sequential management information pieces 400-1 to 400-4 are pieces of information on the logical volumes having the logical volume number "0" and to which the write processing is requested.

Here, the start logical address of the write request range is assumed to be "0x11442230". In the example of FIG. 7, among the sequential management information pieces 400-1 to 400-4, there is the sequential management information piece 400-2 in which the start logical address "0x11442230" is set to the logical address.

In this case, the current write request is deemed as a request to sequential addresses. Accordingly, the thinpro control unit 602 categorizes the current write request as being of a sequential attribute. The sequential attribute indicates that the access destination addresses have the continuity.

On the other hand, the start logical address of the write request range is assumed to be "0x11442850". In the example of FIG. 7, among the sequential management information pieces 400-1 to 400-4, there is no sequential management information piece in which the start logical address "0x11442850" is set to the logical address.

In this case, the current write request is deemed as a request to random addresses. Accordingly, the thinpro control unit 602 categorizes the current write request as being of a random attribute. The random attribute indicates that the access destination addresses do not have the continuity.

(Specific Example of Writeback Processing Including One-Point Formatting)

Next, a specific example of the writeback processing including the one-point formatting on the chunk in the unformatted state is described.

FIG. 8 is an explanatory diagram illustrating the specific example of the writeback processing including the one-point formatting. In FIG. 8, a section (8-1) illustrates an initial state of respective data pieces (Data#0, Data#1, Data#2, and Parity) on the corresponding disk (the HDD) in the storage ST.

In this state, an assumption is made that the writeback request is received in which the write request range does not designate the entire chunk. In this case, as illustrated in a section (8-2), the RAID control unit 604 forms new parity data on the work buffer 306 by padding the user data (the write data) with the zero data. No access to the disk occurs at this point.

Then, as illustrated in a section (8-3), the RAID control unit 604 writes the user data, the zero data, and the new parity data onto the disk in the storage ST. Although illustration is omitted therein, a check code is added to the respective pieces of the data.

Accordingly, it is possible to reduce the overhead at the time of executing the one-point formatting as compared to the conventional case of executing the format processing prior to the I/O processing and then executing the requested I/O processing.

For example, a writeback request for 4 KB is assumed to be requested singly to the pool which is constructed by the RAID 5. In this case, according to the conventional mode, disk reading for the writeback takes place after executing the format processing on the entire size of the chunk, then the parity is formed and the disk writing is performed thereafter. Accordingly, the same area on the disk is accessed three times inclusive of a write penalty.

On the other hand, in the mode illustrated in FIG. 8, when the writeback is requested to the chunk in the unformatted state, the RAID control unit 604 prepares the "zero data+ check code" by using the work buffer 306 in terms of the range in the same chunk to which the I/O is not requested. Thereafter, the RAID control unit 604 executes the write processing on the entire chunk at a time. In this way, reduction in response time is expected as compared to the one-point formatting in the conventional mode.

(Various Processing Procedures of Storage Control Device 101)

Next, various processing procedures of the storage control device 101 are described by using FIGS. 9 to 14. First of all, write request processing procedures of the storage control device 101 are described.

Figure 9:
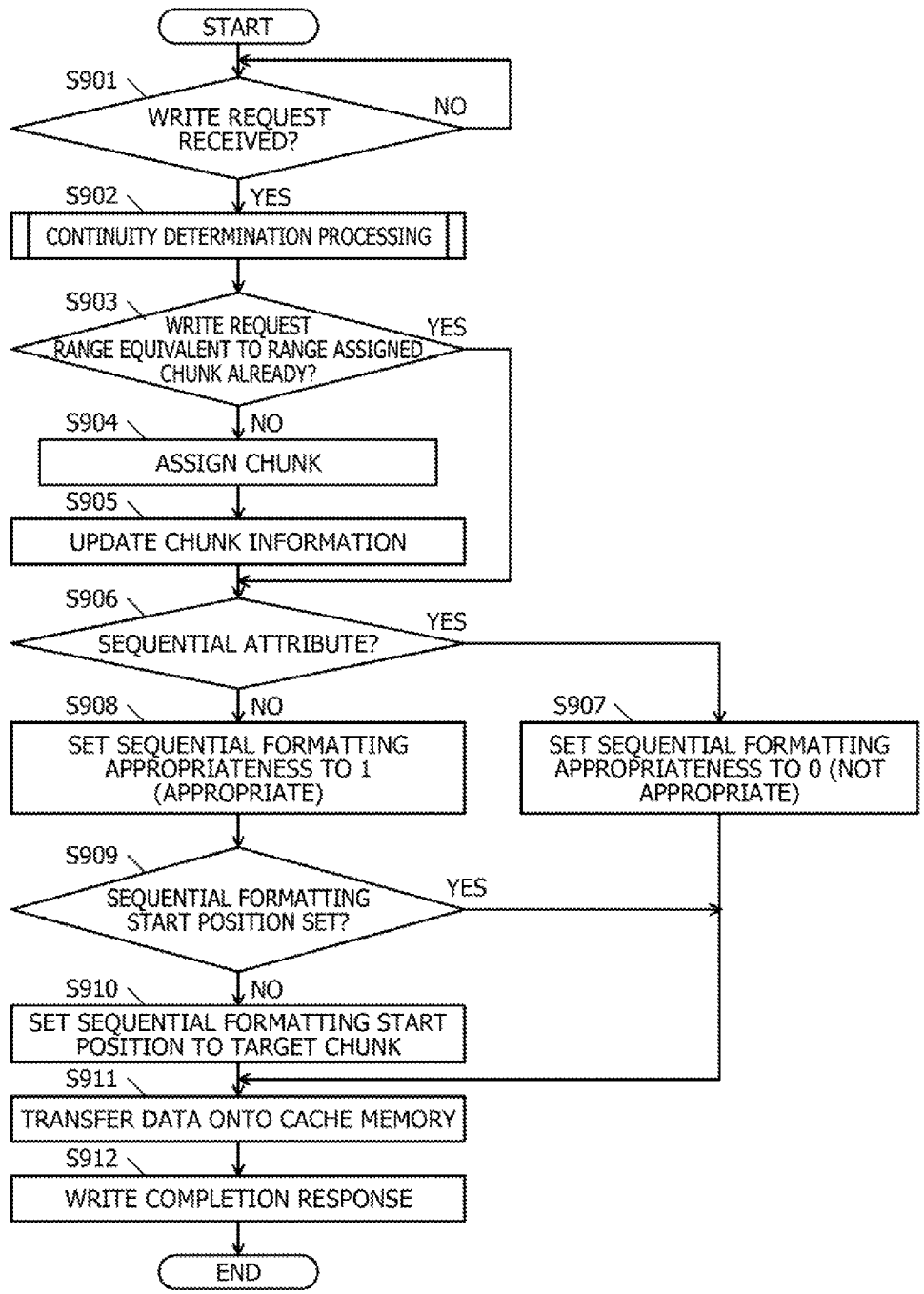
FIG. 9 is a flowchart illustrating an example of write request processing procedures of the storage control device.

Write Request Processing Procedures FIG. 9 is a flowchart illustrating an example of the write request processing procedures of the storage control device 101. In the flowchart of FIG. 9, the I/O control unit 601 of the storage control device 101 first determines whether or not the write request is received (step S901). Here, the I/O control unit 601 waits for the reception of the write request (step S901: No).

When the write request is received (step S901: Yes), the thinpro control unit 602 of the storage control device 101 executes continuity determination processing (step S902). The continuity determination processing is processing to determine the access destination address continuity (the sequential attribute or the random attribute) of the write request. Specific procedures of the continuity determination processing are described later by using FIG. 10.

Next, based on a correspondence relation between the logical address and the physical address of the logical volume, the thinpro control unit 602 determines whether or not the write request range of the write request is equivalent to the range to which the chunk is assigned already (step S903). Here, when the chunk is already assigned (step S903: Yes), the thinpro control unit 602 proceeds to step S906.

On the other hand, if the chunk is yet to be assigned (step S903: No), the thinpro control unit 602 assigns an unused chunk to the logical volume (the portion including the write request range) (step S904). Then, the thinpro control unit 602 updates the corresponding piece of the chunk information in the chunk information table 500 (step S905).

Next, the thinpro control unit 602 determines whether or not the write request is of the sequential attribute (step S906). Here, if the write request is of the sequential attribute (step S906: Yes), the thinpro control unit 602 sets "0 (not appropriate)" to the sequential formatting appropriateness field of the piece of the chunk information on a target chunk (step S907), and then proceeds to step S911.

Here, the target chunk is the chunk assigned to the write request range. The piece of the chunk information on the target chunk is the piece of the chunk information in the chunk information table 500 to which the chunk number of the target chunk is set.

On the other hand, in step S906, if the write request is not of the sequential attribute (step S906: No), the thinpro control unit 602 sets "1 (appropriate)" to the sequential formatting appropriateness field of the piece of the chunk information on the target chunk (step S908).

Then, the thinpro control unit 602 determines whether or not a sequential formatting start position is set (step S909). Here, the sequential formatting start position is information indicating the chunk in the storage ST at which the sequential formatting is to be started.

Here, the storage control device 101 proceeds to step S911 if the sequential formatting start position is set (step S909: Yes). On the other hand, if the sequential formatting start position is not set (step S909: No), the thinpro control unit 602 sets the sequential formatting start position to the target chunk (step S910).

Next, the cache control unit 603 of the storage control device 101 transfers the data (the write request, the write data, and the like) concerning the write request to the cache memory 305 (step S911). Then, the I/O control unit 601 notifies the host device 202 of the write completion response (step S912), and terminates the series of processing on this flowchart.

In this way, at the time of assignment of the chunk in the storage ST to the logical volume in association with the write request, it is possible to set the appropriateness for the sequential formatting to the chunk based on the access destination address continuity.

(Specific Procedures for Continuity Determination Processing)

Figure 10:
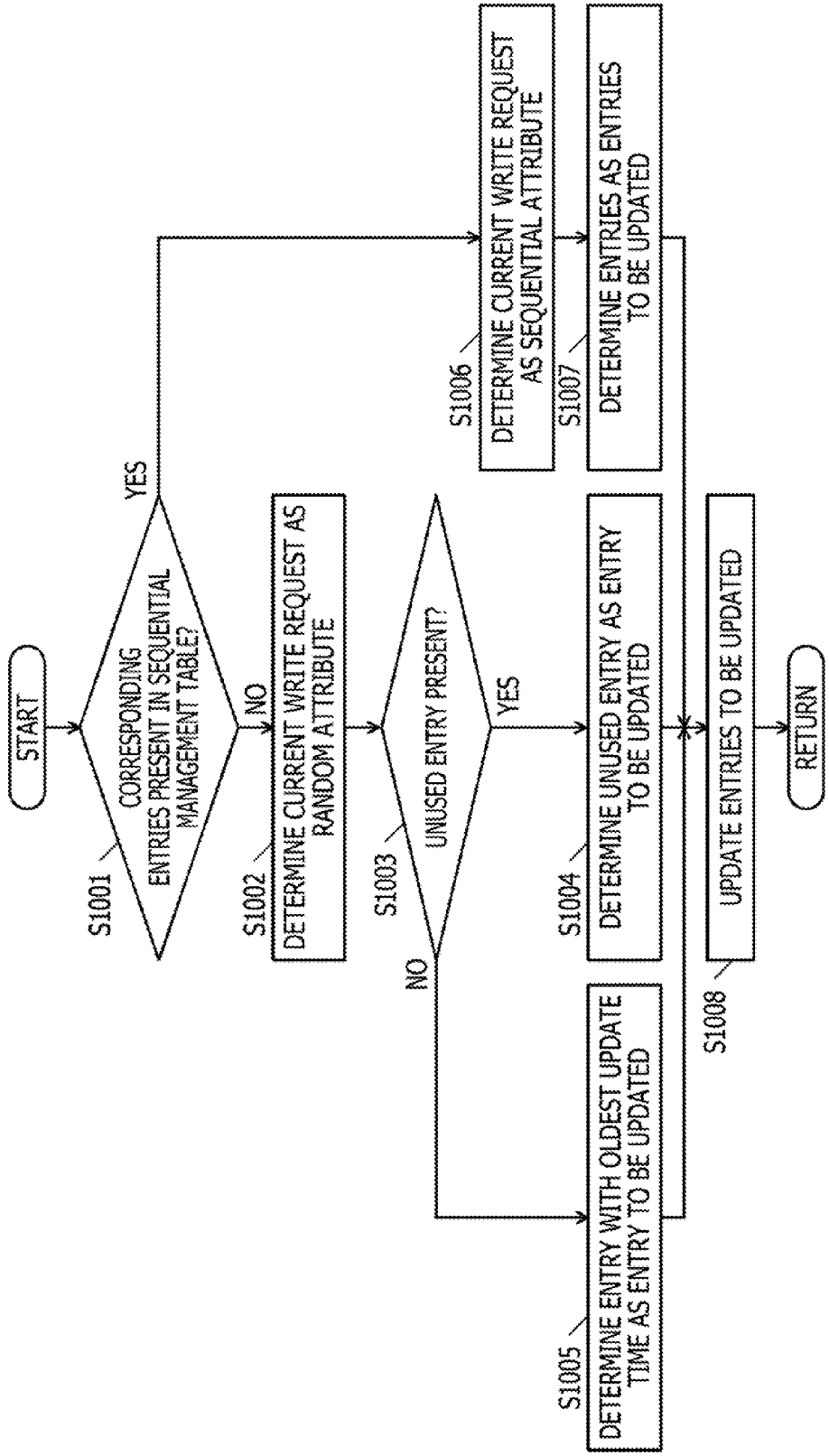
FIG. 10 is a flowchart illustrating an example of specific procedures of continuity determination processing.

Next, the specific procedures of the continuity determination processing in step S902 illustrated in FIG. 9 are described by using FIG. 10.

FIG. 10 is a flowchart illustrating an example of the specific procedures of the continuity determination processing. In the flowchart of FIG. 10, the thinpro control unit 602 of the storage control device 101 first determines whether or not entries corresponding to the logical volume number and the start logical address of the write request range, which are included in the write request, are present in the sequential management table 400 (step S1001).

Here, when the entries are not present (step S1001: No), the thinpro control unit 602 determines the current write request as being of the random attribute (step S1002). Next, the thinpro control unit 602 determines whether or not an unused entry corresponding to the logical volume number included in the write request is present in the sequential management table 400 (step S1003).

Note that the entries corresponding to the logical volume number included in the write request are entries that are prepared in advance for the logical volume having that logical volume number.

Here, if there is an unused entry (step S1003: Yes), the thinpro control unit 602 determines the unused entry as an entry to be updated (step S1004), and then proceeds to step S1008.

On the other hand, if there are no unused entries (step S1003: No), the thinpro control unit 602 determines an entry with the oldest update time among the entries corresponding to the logical volume number included in the write request as the entry to be updated (step S1005), and then proceeds to step S1008.

Meanwhile, if there are the applicable entries in step S1001 (step S1001: Yes), the thinpro control unit 602 determines the current write request as being of the sequential attribute (step S1006). Next, the thinpro control unit 602 determines these entries as the entries to be updated (step S1007).

Thereafter, the thinpro control unit 602 updates the entries to be updated (step S1008), and then returns to the step that invoked the continuity determination processing. Specifically, the thinpro control unit 602 sets "the start logical addresses of the write request range+the number of blocks" to the logical addresses of the entries to be updated, and sets current time to the update time of the entries to be updated.

Thus, it is possible to determine the access destination address continuity of the write request.

Figure 11:
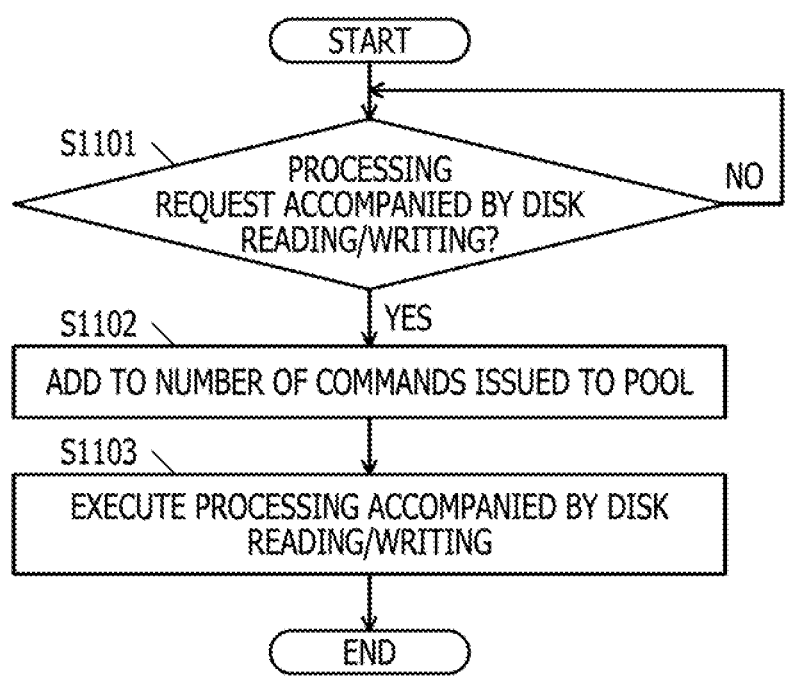
FIG. 11 is a flowchart illustrating an example of request processing procedures of the storage control device.

Request Processing ProceduresNext, request processing procedures of the storage control device 101 are described by using FIG. 11. The request processing is executed in response to the processing request (staging/writeback) accompanied by the reading or writing involving the disk (the HDD), which is requested from the cache control unit 603 to the RAID control unit 604.

FIG. 11 is a flowchart illustrating an example of the request processing procedures of the storage control device 101. In the flowchart of FIG. 11, the RAID control unit 604 of the storage control device 101 first determines whether or not the processing request accompanied by the reading or writing involving the disk (the HDD) is received (step S1101).

Here, the RAID control unit 604 waits for the reception of the processing request (step S1101: No). When the processing request is received (step S1101: Yes), the RAID control unit 604 adds the number of commands issued to the HDD in the pool in response to the processing request to the number of commands issued to the pool (step S1102).

Thereafter, the RAID control unit 604 executes the processing accompanied by the reading or writing involving the disk (step S1103), and terminates the series of processing on this flowchart. Thus, it is possible to update the number of commands issued to the pool in response to the processing request accompanied by the reading or writing involving the disk.

(Writeback Processing Procedures)

Figure 12:
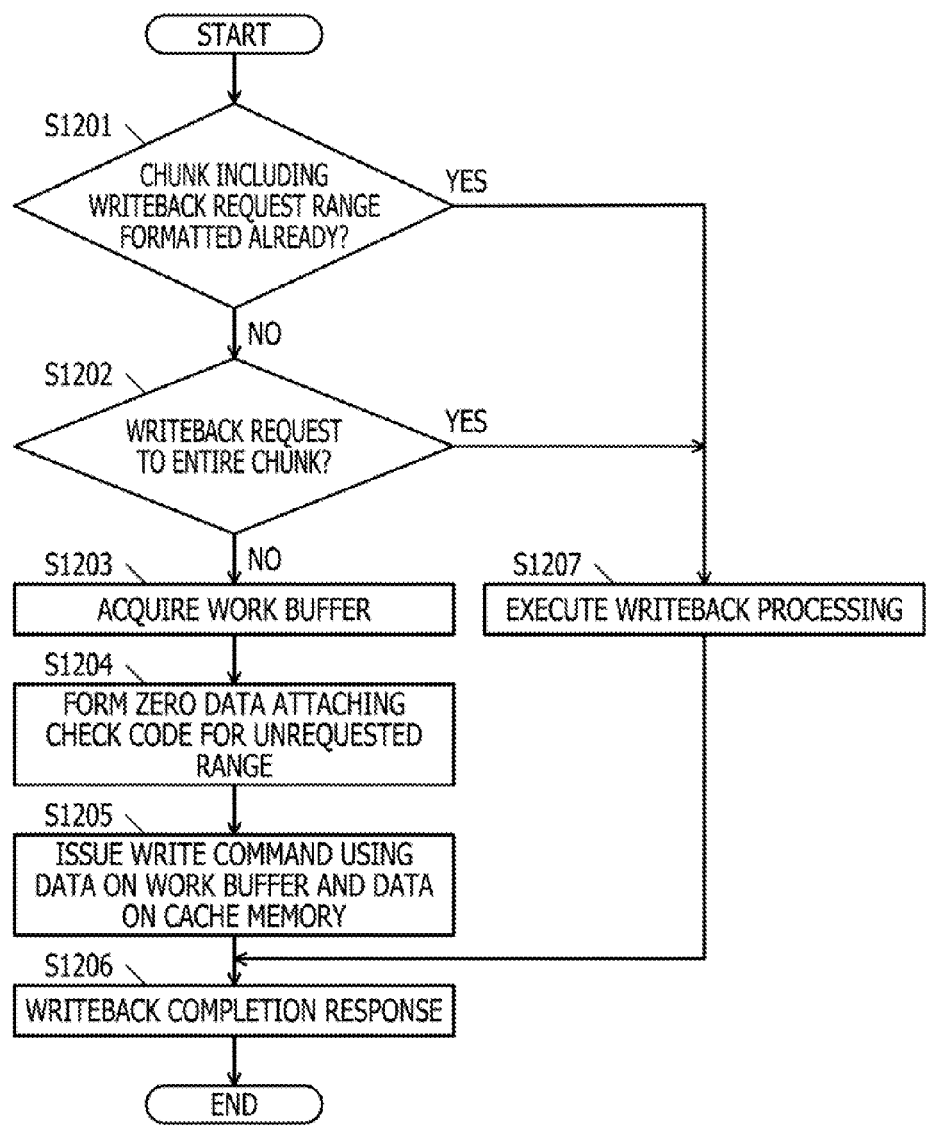
FIG. 12 is a flowchart illustrating an example of writeback processing procedures of the storage control device.

Next, writeback processing procedures of the storage control device 101 are described by using FIG. 12. The writeback processing is an example of the processing accompanied by the reading or writing involving the disk to be executed in step S1103 illustrated in FIG. 11, and is executed in response to the writeback request.

FIG. 12 is a flowchart illustrating an example of the writeback processing procedures of the storage control device 101. In the flowchart of FIG. 12, the RAID control unit 604 of the storage control device 101 first refers to the chunk information table 500 and determines whether or not the chunk including a writeback request range specified by the writeback request is formatted already (step S1201).

Here, if the chunk is in the unformatted state (step S1201: No), the RAID control unit 604 determines whether or not the request is the writeback request to the entire chunk (step S1202). Here, if the request is not the writeback request to the entire chunk (step S1202: No), the RAID control unit 604 acquires the work buffer 306 (step S1203).

Then, the RAID control unit 604 forms, on the work buffer 306, the zero data that attaches the check code for the unrequested range in the chunk to which the writeback is requested (step S1204). Next, the RAID control unit 604 issues the write command to the pool in the storage ST by using the data on the work buffer 306 and the data (the write data and the check code) on the cache memory 305 (step S1205).

Then, the RAID control unit 604 notifies the cache control unit 603 of the writeback completion response (step S1206), and terminates the series of processing on this flowchart. Thus, it is possible to execute the writeback processing including the one-point formatting on the chunk in the unformatted state.

Meanwhile, when the chunk is formatted already in step S1201 (step S1201: Yes), the RAID control unit 604 executes the existing writeback processing by using the data (the write data and the check code) on the cache memory 305 (step S1207), and then proceeds to step S1206.

In the meantime, the RAID control unit 604 proceeds to step S1207 when the request turns out to be the writeback request to the entire chunk in step S1202 (step S1202: Yes). Thus, it is possible to execute the writeback processing while skipping the format processing.

Figure 13:
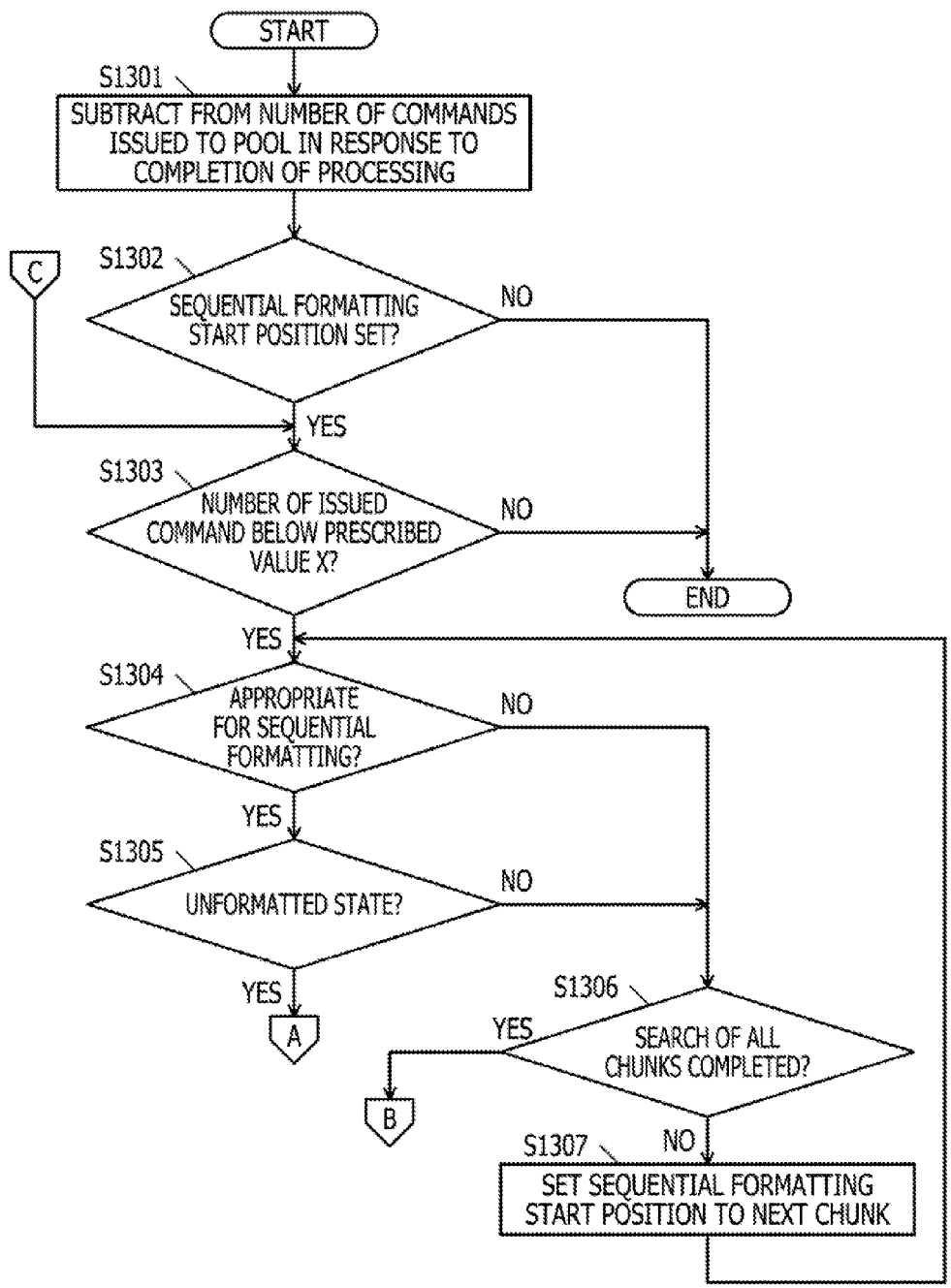
FIG. 13 is a flowchart (part 1) illustrating an example of sequential format processing procedures of the storage control device.
Figure 14:
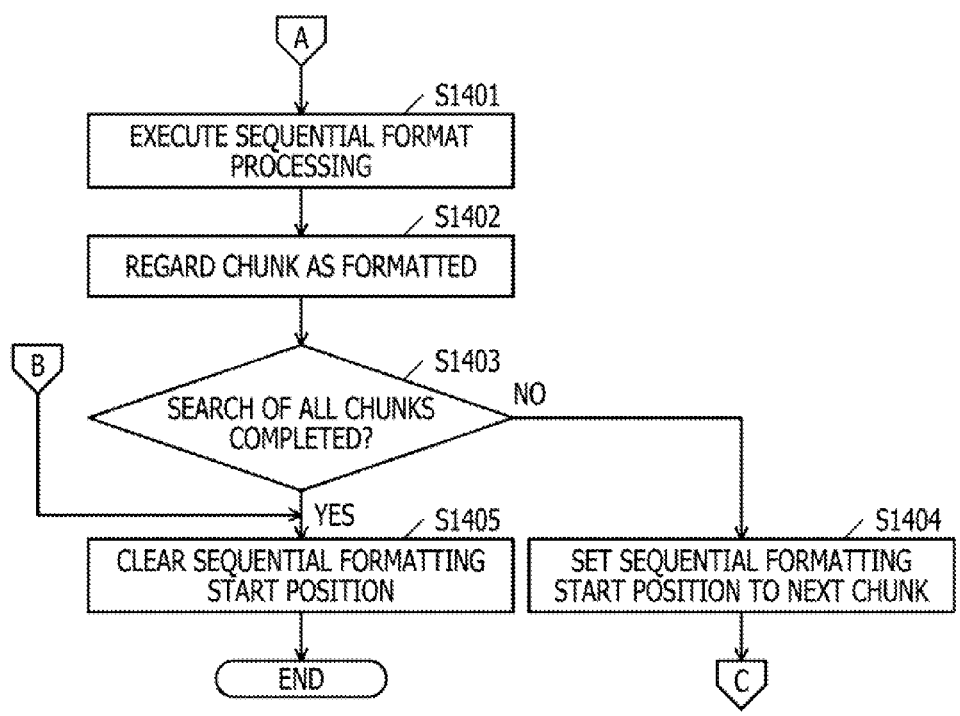
FIG. 14 is a flowchart (part 2) illustrating the example of the sequential format processing procedures of the storage control device.

Sequential Format Processing ProceduresNext, sequential format processing procedures of the storage control device 101 are described by using FIGS. 13 and 14.

FIGS. 13 and 14 are flowcharts illustrating an example of the sequential format processing procedures of the storage control device 101. In the flowchart of FIG. 13, the RAID control unit 604 of the storage control device 101 first subtracts the number of commands corresponding to the processing request from the number of commands issued to the pool in response to the completion of the processing accompanied by the reading or writing involving the disk (step S1301).

Next, the RAID control unit 604 determines whether or not the sequential formatting start position is set (step S1302). Here, if the sequential formatting start position is not set (step S1302: No), the RAID control unit 604 terminates the series of processing on this flowchart.

On the other hand, if the sequential formatting start position is set (step S1302: Yes), the RAID control unit 604 determines whether or not the number of commands issued to the pool in the storage ST falls below the prescribed value X (step S1303). Here, if the number of the issued commands does not fall below the prescribed value X (step S1303: No), the RAID control unit 604 terminates the series of processing on this flowchart.

On the other hand, if the number of the issued commands falls below the prescribed value X (step S1303: Yes), the RAID control unit 604 refers to the chunk information table 500 and determines whether or not the chunk at a sequential formatting start position is appropriate for the sequential formatting (step S1304).

Here, the RAID control unit 604 proceeds to step S1306 when the chunk is not appropriate for the sequential formatting (step S1304: No). On the other hand, if the chunk is appropriate for the sequential formatting (step S1304: Yes), the RAID control unit 604 refers to the chunk information table 500 and determines whether or not the chunk at the sequential formatting start position is in the unformatted state (step S1305).

Here, the RAID control unit 604 proceeds to step S1401 illustrated in FIG. 14 when the chunk is in the unformatted state (step S1305: Yes). On the other hand, if the chunk is formatted already (step S1305: No), the RAID control unit 604 refers to the chunk information table 500 and determines whether or not a search of all the chunks is completed (step S1306).

Here, if the search of all the chunks is not completed (step S1306: No), the RAID control unit 604 sets the sequential formatting start position to the next chunk (step S1307), and then returns to step S1304. On the other hand, if the search of all the chunks is completed (step S1306: Yes), the RAID control unit 604 proceeds to step S1405 illustrated in FIG. 14.

In the flowchart of FIG. 14, the RAID control unit 604 first executes the sequential formatting of the chunk at the sequential formatting start position (step S1401). Then, the RAID control unit 604 regards the chunk at the sequential formatting start position as formatted (step S1402).

Next, the RAID control unit 604 refers to the chunk information table 500 and determines whether or not the search of all the chunks is completed (step S1403). Here, if the search of all the chunks is not completed (step S1403: No), the RAID control unit 604 sets the sequential formatting start position to the next chunk (step S1404), and then returns to step S1303 illustrated in FIG. 13.

On the other hand, if the search of all the chunks is completed (step S1403: Yes), the RAID control unit 604 clears the sequential formatting start position (step S1405), and terminates the series of the processing on this flowchart. Thus, it is possible to control the timing to execute the format processing on the chunk, which is set as being appropriate for the sequential formatting, depending on the amount of I/O requests to the storage ST.

As described above, according to the storage control device 101 of the embodiment, it is possible to set the appropriateness for the sequential formatting on each chunk based on the access destination address continuity at the time of assignment of the chunk in the storage ST in association with the write request. Moreover, according to the storage control device 101, it is possible to control the timing to execute the format processing on the chunk, to which the appropriateness for the sequential formatting is set, based on the amount of I/O requests to the storage ST.

In this way, in the state where the load on the storage ST is sufficiently low so as not to cause deterioration in I/O performance even if the background processing is executed, it is possible to execute the format processing on the chunk to which the appropriateness for the sequential formatting is set. Meanwhile, it is possible to reduce the operation frequency of the one-point formatting by proceeding with the format processing on the chunk in the state of the low load on the storage ST.

Moreover, according to the storage control device 101, it is possible to execute the format processing on the chunk in the unformatted state, to which the appropriateness for the sequential formatting is set, when the amount of I/O requests to the storage ST falls below the prescribed value X. In this way, it is possible to reduce the risk of deterioration in I/O performance that might be caused by executing the sequential formatting in the state of a high load on the storage ST.

Furthermore, according to the storage control device 101, at the time of the write processing on the chunk in the unformatted state, it is possible to perform the writing by use of the data prepared by padding the portion other than the write data with the format pattern. In this way, it is possible to execute the one-point formatting on the chunk in the unformatted state at the time of the write processing on the chunk. In addition, as compared to the one-point formatting in the conventional mode, it is possible to reduce the number of times of access to the disk and thus to reduce the response time.

Moreover, according to the storage control device 101, when the write request range designates the entire chunk, it is possible to execute the write processing while skipping the format processing on the chunk. In this way, it is possible to omit the format processing and thus to reduce the load at the time of the writeback request to the entire chunk.

Furthermore, according to the storage control device 101, at the time of assignment of the chunk in the storage ST in association with the write request, it is possible to determine the value of the check code corresponding to the chunk. In addition, according to the storage control device 101, it is possible to execute the write processing on the chunk by using the determined value of the check code. Specifically, the storage control device 101 is capable of determining the value of the check code corresponding to the chunk based on the logical address of the logical volume of the access destination, for example. Thus, the storage control device 101 is also applicable to a storage system which is bound to provide an external server (such as the host device 202) with guarantee of the check code.

Given these features, according to the storage control device 101 of the embodiment, it is possible to efficiently execute the format processing on the logical volume by performing the format operation so as to correspond to I/O request patterns. Meanwhile, in the case of newly forming a physical capacity pool or providing an additional capacity by increasing a disk, the format processing does not have to be executed on the entirety of the newly added capacity unlike the conventional mode regardless of conditions of assignment to the user volume.

Moreover, in the case of rebuild processing associated with a disk failure in the storage ST, data reconstruction processing does not have to be executed on the entire disk capacity unlike the conventional mode regardless of the conditions of assignment to the user volume. Specifically, the data reconstruction processing may be executed on a chunk which is actually assigned to the user volume and is loading the data. Thus, it is possible to execute the rebuild processing efficiently.

Now, a format operation example corresponding to I/O request patterns is described.

FIG. 15 is an explanatory diagram illustrating the format operation example corresponding to I/O request patterns. In FIG. 15, volumes #A and #B are user volumes (logical volumes) offered by the storage system 200. Here, an assumption is made that a write request of the sequential attribute to the volume #A is received. Moreover, another assumption is made that a write request of the random attribute to the volume #B is received.

As illustrated in FIG. 15, the write request from the host device 202 is stored in the cache memory 305, and the data from the cache memory 305 is written in the disk (the HDD) in the storage ST when there is spare time for the processing (so called the writeback).

For example, regarding the chunk which receives the write request of the sequential attribute, the write processing may be executed at the timing of the writeback while omitting the format processing since the data in the entire chunk is complete. On the other hand, the data in the entire chunk is incomplete in the case of the chunk which receives the write request of the random attribute. Accordingly, the one-point formatting takes place by executing the writeback processing while filling the unrequested range with the zero data. In the meantime, in the case of the chunk in the unformatted state to which the appropriateness for the sequential formatting is set, the sequential formatting is executed before the writeback request depending on the load on the disk.

Note that it is possible to implement the storage control method described in this embodiment by causing a computer such as a personal computer and a workstation to execute a program prepared in advance. Such a storage control program is recorded in a computer-readable storage medium such as a hard disk, a flexible disk, a CD-ROM, a magneto-optical disk (MO), a digital versatile disk (DVD), and a Universal Serial Bus (USB) memory, and is executed by being read from the storage medium by the computer. Alternatively, the storage control program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device configured to control a storage device, the storage control device comprising:
    a memory; and
    a processor coupled to the memory and configured to:
        receive a request of writing of data from an information processing device,
        assign a unit memory area in the storage device in response to the request of writing,
        determine whether a sequential format processing is to be executed on the unit memory area based on continuity of logical addresses designated by the request of writing, and
        determine a timing to execute the sequential format processing on the unit memory area based on a number of commands per unit time to the storage device when the sequential format processing is determined to be executed on the unit memory area.

2. The storage control device according to claim 1, wherein
    the sequential format processing is a processing to write at least one of zero data and a check code sequentially from an initial physical address in the unit memory area.

3. The storage control device according to claim 2, wherein
    the processor is configured to execute the sequential format processing on the unit memory area when the number of the commands per the unit time is under a first value.

4. The storage control device according to claim 3, wherein
    the processor is configured to write format pattern data in a portion of the unit memory area in which the data is not written, when a write processing of the data is executed on the unit memory area in a state where the format processing is not executed.

5. The storage control device according to claim 4, wherein
    the format pattern data is the zero data.

6. The storage control device according to claim 3, wherein
    the processor is configured to execute a write processing of the data without executing the format processing on the unit memory area, when the data is to be written in the entire unit memory area.

7. The storage control device according to claim 3, wherein
    the sequential format processing is the processing to write the check code sequentially from the initial physical address in the unit memory area, and
    the processor is configured to:
        determine a value of the check code corresponding to the unit memory area, and
        execute the write processing of the data in the unit memory area using the determined value of the check code.

8. A storage system comprising:
    a storage device; and
    a storage control device coupled to the storage device, the storage control device including:
    a memory; and
    a processor coupled to the memory and configured to:
        receive a request of writing of data from an information processing device,
        assign a unit memory area in the storage device in response to the request of writing,
        determine whether a sequential format processing is to be executed on the unit memory area based on continuity of logical addresses designated by the request of writing, and
        determine a timing to execute the sequential format processing on the unit memory area based on a number of commands per unit time to the storage device when the sequential format processing is determined to be executed on the unit memory area.

9. The storage system according to claim 8, wherein
    the sequential format processing is a processing to write at least one of zero data and a check code sequentially from an initial physical address in the unit memory area.

10. The storage system according to claim 9, wherein
    the processor is configured to execute the sequential format processing on the unit memory area when the number of the commands per the unit time is under a first value.

11. The storage system according to claim 10, wherein
    the processor is configured to write format pattern data in a portion of the unit memory area in which the data is not written, when a write processing of the data is executed on the unit memory area in a state where the format processing is not executed.

12. The storage system according to claim 11, wherein
    the format pattern data is the zero data.

13. The storage system according to claim 10, wherein
    the processor is configured to execute a write processing of the data without executing the format processing on the unit memory area, when the data is to be written in the entire unit memory area.

14. The storage system according to claim 10, wherein
    the sequential format processing is the processing to write the check code sequentially from the initial physical address in the unit memory area, and
    the processor is configured to:
        determine a value of the check code corresponding to the unit memory area, and
        execute the write processing of the data in the unit memory area using the determined value of the check code.

15. A method executed by a storage control device coupled to a storage device, the method comprising:
    receiving a request of writing of data from an information processing device;

assigning a unit memory area in the storage device in response to the request of writing;

determining whether a sequential format processing is to be executed on the unit memory area based on continuity of logical addresses designated by the request of writing; and determining a timing to execute the sequential format processing on the unit memory area based on a number of commands per unit time to the storage device when the sequential format processing is determined to be executed on the unit memory area.

16. The method according to claim 15, wherein the sequential format processing is a processing to write at least one of zero data and a check code sequentially from an initial physical address in the unit memory area.

17. The method according to claim 16 further comprising:

executing the sequential format processing on the unit memory area when the number of the commands per the unit time is under a first value.

18. The method according to claim 17 further comprising:

writing format pattern data in a portion of the unit memory area in which the data is not written, when a write processing of the data is executed on the unit memory area in a state where the format processing is not executed.

19. The method according to claim 18, wherein the format pattern data is the zero data.

20. The method according to claim 17 further comprising:

executing a write processing of the data without executing the format processing on the unit memory area, when the data is to be written in the entire unit memory area.

* * * * *